Figure 3:
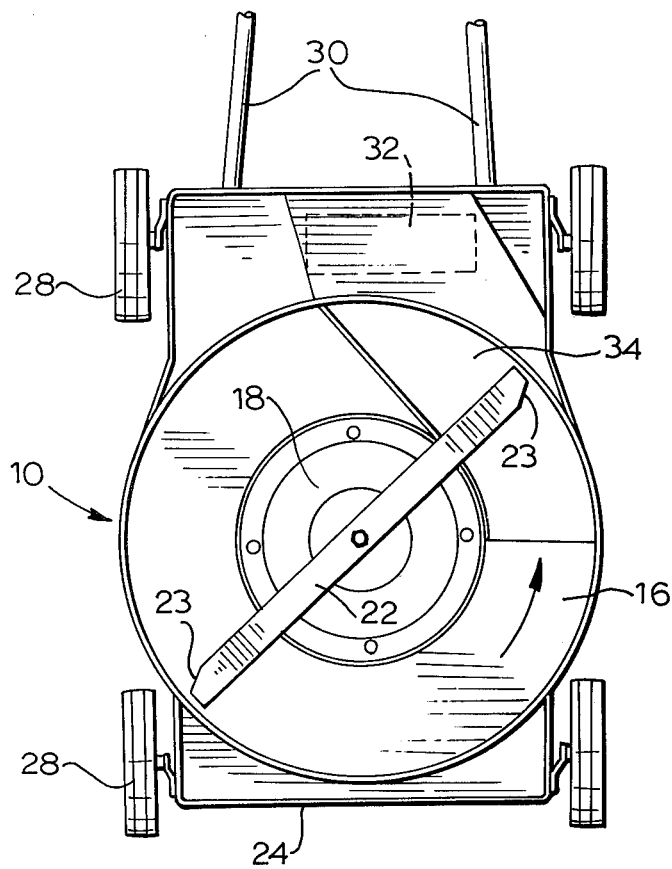

United States Patent [19]

Szymanis

[11] 4,244,164

[45] Jan. 13, 1981

[54] SAFETY LAWN MOWER AND GRASS COLLECTOR

[75] Inventor: Edward Szymanis, Midhurst, Canada

[73] Assignee: Canadian General Electric Company Limited, Toronto, Canada

[21] Appl. No.: 40,697

[22] Filed: May 21, 1979

[30] Foreign Application Priority Data

Jul. 7, 1978 [CA] Canada .................................. 306982

[51] Int. Cl.³ .................................................. A01D 35/22
[52] U.S. Cl. ..................................... 56/202; 56/320.2
[58] Field of Search ............... 56/199, 200, 202, 203, 56/204, 205, 206, 320.2, 13.4

[56] References Cited

U.S. PATENT DOCUMENTS

| | | | |
|---|---|---|---|
| 121,960 | 12/1871 | Peters | 137/875 |
| 2,347,936 | 5/1944 | Crewson | 137/862 |
| 2,990,666 | 7/1961 | Blume | 56/320.2 |
| 3,199,277 | 8/1965 | Moody | 56/202 |
| 3,872,656 | 3/1975 | Dahl | 56/202 |
| 3,961,467 | 6/1976 | Carpenter | 56/202 |
| 3,971,198 | 7/1976 | Lane | 56/202 |

Primary Examiner—Robert A. Hafer
Attorney, Agent, or Firm—Raymond A. Eckersley

[57] ABSTRACT

A rotary blade lawn mower has a grass collecting bin secured to the deck thereof, preferably wholly within the wheelbase of the lawn mower. A squirrel tail duct transfers grass cuttings from the cutting chamber to the bin. The elbow portion of the duct hinges aside to provide access for emptying the bin. Automatic means is provided for closing the duct as the elbow portion is moved to its non-obstructing position. The arrangement is particularly suitable for relatively lightweight electrically powered walk-behind lawn mowers.

10 Claims, 4 Drawing Figures

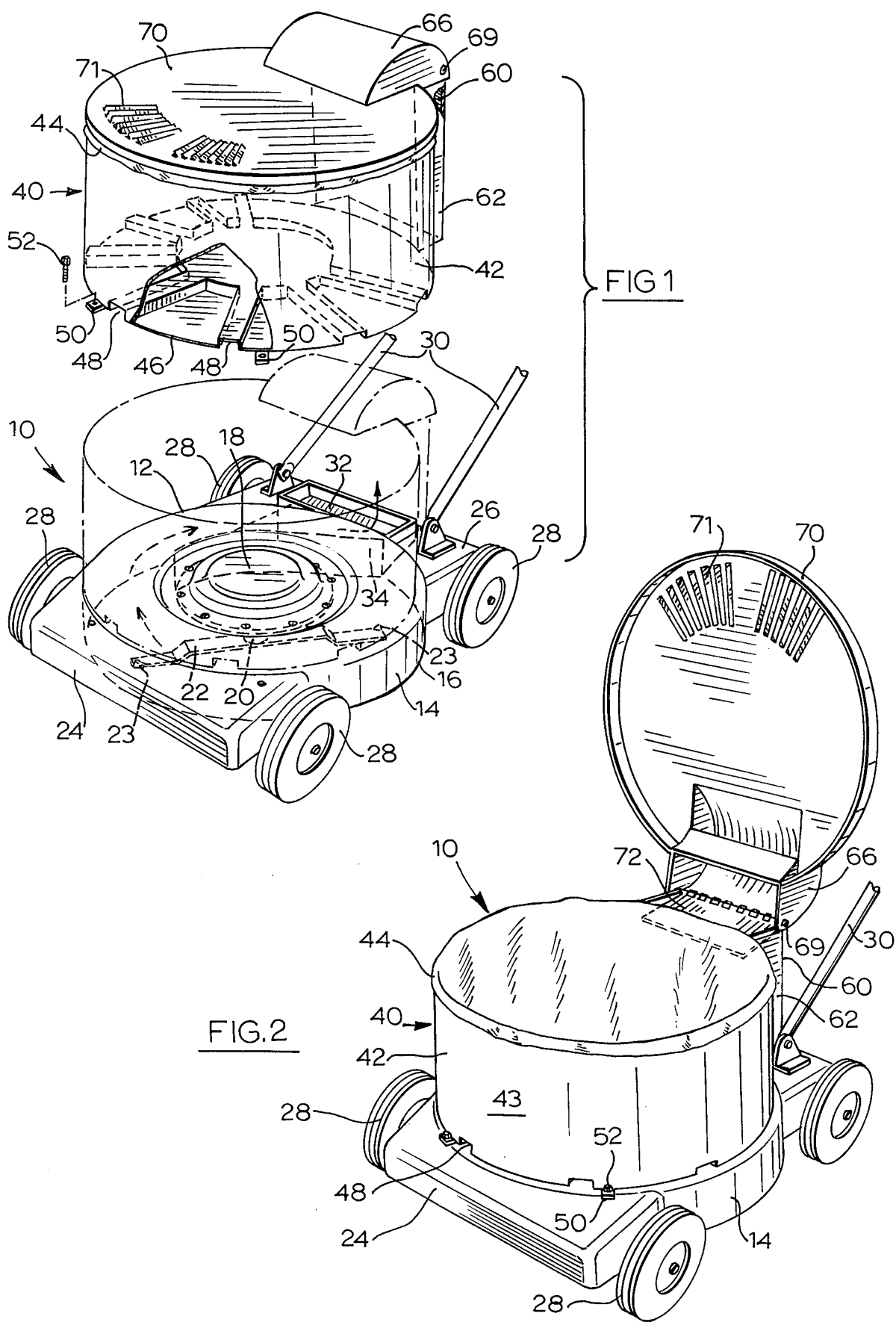

SAFETY LAWN MOWER AND GRASS COLLECTOR

This invention relates to power lawn mowers of the rotary bladed type. It particularly relates to improvements in the collection of grass cuttings with concomitant improvements in safety and in the ease of handling of the lawn mower.

A rotary lawn mower in its most rudimentary form comprises a deck including a cutting chamber within which one or more cutting blades is mounted for rotary movement in a horizontal plane. Grass cut by the blade is normally ejected from the cutting chamber by one or more chutes which usually give direct access to the cutting blade. Numerous accidents have been reported due to contact of hands or other body members with the blade when attempts have been made to unblock chutes with the cutting blade in orbit. Still further accidents have been reported due to the ejection through the chute of stones or other objects which may be struck by the cutting blade.

These dangers may be nullified to a large extent by the attachment of a grass collector to the chute exit. However, the user is normally given the option of removing the collector, and indeed most collectors must be removed in order to empty them.

This invention contemplates improvements wherein the collector is not intended to be removed from the deck of the lawn mower. Provision is made for the grass to be collected in an open-topped bin mounted upon the deck, and a squirrel tail duct means is provided to discharge the grass cuttings into the bin. The bin may be provided with a plastic bag liner or the like which may be withdrawn for emptying. The upper portion of the duct is adapted to pivot so as not to obstruct the opening of the bin when it is desired that this be emptied. Vane means is further provided so that as the duct is pivoted the vane grossly seals the duct to prevent access to the chute and thus to prevent accidental contact with the cutting blade, and also to prevent objects being forcefully ejected through the duct. Desirably the bin is provided with a lid which is integral with the pivoting portion of the duct, the lid and duct then being simultaneously moveable to provide full access to the bin for emptying.

Figure 4:
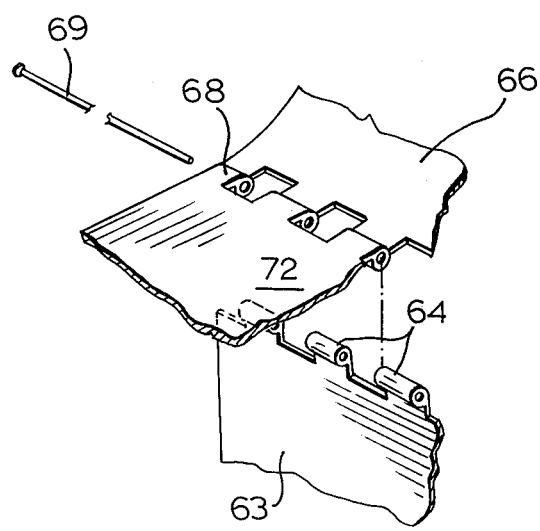

My invention will be further described in relation to a preferred embodiment thereof which is illustrated in the accompanying drawings wherein FIG. 1 is an exploded, partially cut away isometric view of a lawn mower constructed in accordance with my invention, FIG. 2 is similar to FIG. 1, but shows the grass collector in assembled relation with the lawn mower and with the lid in the raised position, FIG. 3 shows a plan view the underside of the lawn mower of FIG. 1, FIG. 4 shows detail of the hinge structure employed in the construction of FIG. 1.

In FIGS. 1, 2 and 3 a lawn mower is denoted generally by the numeral 10, and comprises a deck 12 having a skirt portion 14 downwardly dependent therefrom to define a downwardly opening cutting chamber 16. A pancake form electric motor 18 is mounted on the deck above the cutting chamber 16, and a vertical drive shaft 20 projects downwardly from motor 18 into chamber 16. A cutting blade 22 is secured to drive shaft 20 adjacent the distal end thereof. Deck 12 includes apron portions 24 and 26 located respectively at the forward and rearward ends of lawn mover 10, taken in the normal direction of travel of the lawn mower. Wheels 28 are mounted from aprons 24 and 26 for perambulatory movement of the lawn mower 10. Handle means 30 is secured to apron 26.

As illustrated, blade 22 rotates in a clockwise direction when viewed from above. Taken relative to a transverse plane extending through the axis of rotation of the blade, the grass will be cut by the portion of the blade rotating in the angular interval 0°–180°. Grass cuttings are discharged from the cutting chamber 16 through a generally horizontal discharge chute opening 32 formed in rear apron portion 26 of deck 12. Chute opening 32 connects to cutting chamber 16 via chute 34 which extends within cutting chamber 16 over the angular interval of about 180° to 270° and below the rear apron 26. Grass cuttings from cutting chamber 16 are impelled by a current of air swept by upturned tip portions 23 of cutting blade 22. The volume of swept air can be controlled as desired by providing larger upstanding blade portions on cutting blade 22 or even air propelling blades separate from cutting blade 22, as is generally known in the art.

The grass collector portion of lawn mower 10 is generally denoted by the numeral 40, and comprises an open topped bin 42. Since bin 42 merely serves to store collected grass cuttings there are no critical mandates regarding its shape, size or material of construction. It is generally preferred that it locate on deck 12 within the confines of wheels 28 so as not to form an impediment to the use of lawn mower 10 in close proximity to trees, walls etc. Also, since walk-behind electric lawn mowers are normally constructed to be of relatively light weight, the location of bin 42 within the wheelbase of the lawn mower provides enhanced stability. Where, as in certain prior art constructions, the grass collector is placed wholly to the side or rear of the lawn mower, there is a distinctly increased possibility of the lawn mower overturning to expose the rotating cutting blade and thus creating an unnecessary hazard. For these reasons, and also from aesthetic considerations I form bin 42 with upstanding walls 43 which are generally a continuum of skirt 14, the plan-form area of bin 42 thus being generally coextensive with that cutting chamber 16.

Bin 42 should be formed so as to be self supporting. This may be either as a self supporting skeletal framework upon which there is hung a non-self supporting material, or wherein the walls of bin 42 are themselves formed from self supporting material. Desirably even where the walls 43 are self supporting a removable collapsible liner 44 may be provided within bin 42, and this may then be removed to empty the bin. Preferably the walls 43 of bin 42 are formed from a rigid plastic material such as high impact polystyrene Noryl ® polyphenylene oxide or Lexan ® polycarbonate. Desirably walls 43 will be smooth and unbroken so that they will not snag upon branches, and also so that bin 42 may be used without a liner 44 if so desired. Where bin 42 is constructed to be air impervious the floor 46 of bin 42 is constructed to be air impervious the floor 45 of bin 42 is provided with channels 48 which form passages for coolant air flow to electric motor 18. Alternative constructions serving the same purpose are of course possible, and these may include providing ribs or channels on deck 12, for example.

Grass collector 40 is provided with brackets 50 which secure to deck 12 with bolts 52 so as to retain the collector in a fixed position.

At the rear of grass collector 40 there is formed a duct 60 which comprises a generally upstanding portion 62 having a height equal to that of wall 43. Duct portion 62 is generally rectangular in cross section, the forward wall portion thereof being common to both duct 62 and bin 42. Discharge chute opening 32 is proportioned so that it will telescope into the lower end of duct portion 62. The rearward wall 63 of duct portion 62 terminates at its upper end in hinge joint segments 64, shown in fragmentary view in FIG. 4. Duct 60 further comprises an elbow portion 66 which connects between duct portion 62 and bin 42. The rearward edge of elbow duct portion 66 is provided with hinge joint segments denoted as 68 in FIG. 4, these being adapted to join with segments 64 to form a hinge joint, the joined segments being pinned with hinge pin 69. Elbow duct portion 66 is thus pivotable and moveable between a first position, shown in FIG. 1, wherein it overhangs bin 42, and a second position, shown in FIG. 2, where it is raised to be clear of bin 42, thereby permitting unfettered withdrawal of a full liner 44 from bin 42. Bin 42 is also provided with a lid 79. Lid 70 is preferably constructed from a rigid material to prevent the escape of hard objects which might be ejected with grass cuttings into bin 42. Air escape louvres 71 are provided in lid 70 remote from the inlet side of lid 70, i.e. that side adjacent duct elbow portion 66, to enhance grass distribution in bin 42. As illustrated lid 70 is integrally attached to the distal end of duct elbow portion 66 so that together these portions cover bin 42. By combining these portions it will be apparent that it is not necessary to disassembly these portions and move them separately when access to the interior of bin 42 is required. Less apparent, however, it will not be possible to collect grass cuttings without bin 42 being covered, as will be later discussed.

Duct elbow portion 66 is provided with a vane portion 72 which projects below hinge segments 68 to form a rigid extension of the outer wall of duct elbow portion 66. When duct elbow portion 66 is in its normal, closed position as in FIG. 1, vane 72 projects vertically downwardly within vertical duct portion 62, and provides no appreciable flow obstruction. When duct elbow portion 66 is raised to its open position as in FIG. 2 so as to provide access to the interior of bin 42, vane 72 moves to a generally horizontal position to at least grossly seal duct 60 to prevent access being gained into chute 34 and cutting chamber 16.

Vane 72 will also prevent hard objects such as stones propelled by blade 22 from being ejected from duct portion 62 when duct elbow portion 66 is in its raised position. Such objects could conceivably be ejected forcefully into bin 42 when duct elbow portion 66 is in its lower position, and could possibly create a hazard if lawn mower 10 is operated without the bin being covered. By unifying lid 70 with duct elbow portion 66 this possibility of hazard is rendered remote.

What I claim as new and desire to secure by Letters Patent of the United States is:

1. A lawn mower comprising a deck having a downwardly opening cutting chamber and an apron portion rearwardly extending from said deck, a cutting blade mounted from an electrical prime mover mounted on said deck for rotary movement in a generally horizontal plane, a discharge chute opening provided in the rearwardly extending apron portion of said deck to permit the discharge of grass cuttings therethrough, an upwardly opening bin means mounted upon said deck above said cutting chamber for collecting said cuttings, duct means connecting between said discharge chute opening and said bin means, said duct means comprising a first generally vertical portion connected at the lower end to said discharge chute opening, an elbow portion hingedly connected to the upper end of said vertical portion and moveable between a first position overhanging said bin means and a second position generally clear thereof, vane means associated with said elbow portion and moveable therewith to a position obstructing access to said discharge opening as said elbow portion is moved to said second position and to a non-obstructing position as said elbow portion is moved to said first position, and chute means extending within said cutting chamber and below the apron portion of said deck to connect said discharge chute opening to said cutting chamber.

2. The lawn mower of claim 2 wherein said vertical duct portion is integral with said bin, the forward wall of said vertical portion being common with a wall portion of said bin.

3. The lawn mower of claim 2 wherein a lid covers said bin means, said lid being integrally attached to said elbow portion.

4. The lawn mower of claim 2 wherein said bin means in constructed from a self supporting, impervious material.

5. The lawn mower of claim 2 wherein said bin means is provided with a collapsible liner.

6. The lawn mower of claim 2 wherein said discharge chute opening is formed in a generally horizontal plane.

7. The lawn mower of claim 2 wherein said duct means is generally rectangular in cross section.

8. The lawn mower of claim 1 wherein said elbow has an outer wall hinged to the rearward wall of said vertical duct portion and said vane means is formed as a rigid extension of said outer wall of said elbow duct portion which projects within said vertical duct portion.

9. The lawn mower of claim 1 wherein passage means is provided between the bottom wall of said bin and said deck for the passage of cooling air to the electrical prime mover.

10. The lawn mower of claim 9 wherein said bin means is generally coextensive in plan-form area with that of said cutting chamber.

* * * * *